United States Patent Office 3,755,572
Patented Aug. 28, 1973

---

3,755,572
COMBATING ACARIDS AND INSECTS WITH AMIDO-THIONO-PHOSPHORIC ACID PHENYL ESTERS
Gerhard Schrader, Wuppertal-Cronenberg, Ingeborg Hammann, Cologne, and Wilhelm Stendel, Wuppertal-Vohwinkel, Germany, assignors to Bayer Aktiengesellschaft, Leverkusen, Germany
No Drawing. Original application Nov. 13, 1968, Ser. No. 775,540, now Patent No. 3,621,082. Divided and this application Apr. 15, 1971, Ser. No. 134,436
Claims priority, application Germany, Nov. 30, 1967, P 16 68 047.0
Int. Cl. A01n 9/36
U.S. Cl. 424—212                      14 Claims

ABSTRACT OF THE DISCLOSURE (N-unsubstituted and N-mono- and N,N-di- -alkyl-substituted amido)-O-alkyl-O-[(2-carboalkoxy and 2-carbocycloalkyloxy, i.e. 2-alkoxy carbonyl and 2-cycloalkyloxy carbonyl)phenyl]-thiono-phosphoric acid esters which possess arthropodicidal, especially acaricidal and insecticidal, properties and which may be produced by reacting the corresponding thionophosphoric acid diester monohalide with ammonia or a primary or a secondary amine.

---

This application is a division of application Ser. No. 775,540, filed Nov. 13, 1968, now U.S. Pat. No. 3,621,082.

The present invention relates to and has for its objects the provision for particular new amido-thiono-phosphoric acid phenyl esters, i.e. (N-unsubstituted and N-mono- and N,N-di- -alkyl-substituted amido)-O-alkyl-O-[(2 - carboalkoxy and 2-carbocycloalkyloxy, i.e. 2-alkoxy carbonyl and 2-cycloalkyloxy carbonyl) phenyl]-thiono-phosphoric acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

German Pat. 814,152 describes N,N-dimethylamido-O-ethyl- (A) or bis-(N,N-dimethyl)-amido- (B) - phosphoryl-salicylic acid ethyl esters which are obtainable by reaction of alkali metal salts of salicylic acid ester with the appropriate di-substituted phosphoric acid monochlorides. According to the information given in German Pat. 811,514, the aforesaid compounds are suitable for the active and passive control of sucking and eating insects. They are therefore usable as pesticides.

Furthermore, O,O - dialkyl-thiono-phosphoryl-salicylic acid esters as well as their insecticidal and toxic effect are already known (R. L. Metcalf, Organic Insecticides (Interscience Publishers, New York, 1955)).

It has been found in accordance with the present invention that the particular new amido-thiono-phosphoric acid phenyl esters of the formula

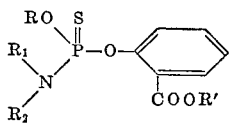
(I)

in which
R is lower alkyl,
R' is alkyl of 1–6 carbon atoms or cycloalkyl of 5–6 ring carbon atoms,
R₁ is hydrogen or lower alkyl, and
R₂ is hydrogen or lower alkyl, exhibit strong arthropodicidal, especially insecticidal and acaricidal, properties.

The present invention also provides a process for the production of compounds of Formula I above in which an O-alkyl-thiono-phosphoric acid ester dihalide is reacted with a salicylic acid alkyl ester (or salt thereof) to form an O-alkyl-O-(2 - carbalkoxy-phenyl)-thiono-phosphoric acid diester monohalide of the formula:

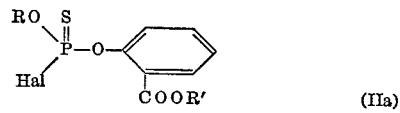
(IIa)

in which R and R' are the same as defined above, and Hal is a halogen atom, preferably chloro or bromo, and the latter compound is then reacted with ammonia or a primary or secondary amine of the formula:

(II)

in which R₁ and R₂ are the same as defined above.

Advantageously, the particular new compounds of Formula I are distinguished by outstanding insecticidal and acaricidal properties as well as, in some cases, extremely low toxicity to warm-blooded animals and concomitantly low phytotoxicity. The instant compounds possess a very strong activity against eating as well as sucking insects, and are in this respect superior to comparable known compounds of analogous constitution. The new compounds of the present invention therefore represent a genuine enrichment of the art.

The course of the two steps of the process of the invention is illustrated by the following reaction schemes:

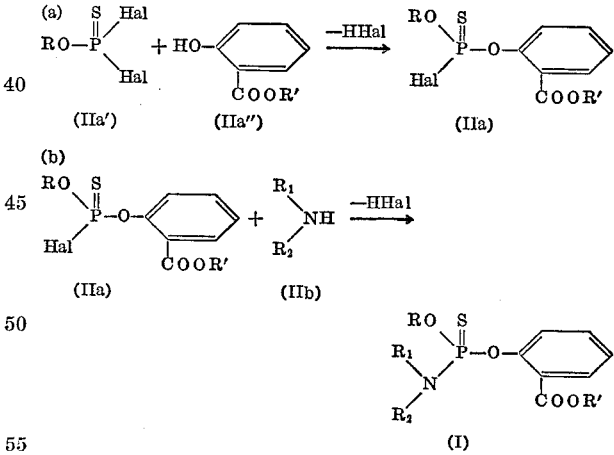

in which the symbols R, R', R₁, R₂ and Hal are the same as defined above.

Advantageously, in accordance with the present invention, in the various formulae herein:

R represents straight and branched chain lower alkyl such as methyl to tert.-butyl inclusive, especially methyl, ethyl, n- and iso-propyl, n-, iso- and s-butyl, and the like, and more particularly alkyl having 1–4 or 1–3, and preferably 1–2, carbon atoms;

R' represents straight and branched chain alkyl having 1–6 carbon atoms such as methlyl to tert.-butyl inclusive as defined above, amyl, n-hexyl, pinacolyl (i.e. [CH₃]₃C—[CH₃]CH—), and the like, and more particularly alkyl having 2–6 or 2–5, and preferably, 2–4, carbon atoms, or 1–5, and preferably, 1–4, carbon atoms; or cycloalkyl having 5–6 ring carbon atoms such as cyclopentyl and cyclohexyl, and preferably cyclohexyl;

$R_1$ represents hydrogen; or lower alkyl such as methyl to tert.-butyl inclusive as defined above, and the like, and more particularly alkyl having 1–4 or 1–3 carbon atoms, preferably methyl and isopropyl; and $R_2$ represents hydrogen; or lower alkyl such as methyl to tert.-butyl inclusive as defined above, and the like, and more particularly alkyl having 1–4 or 1–3 carbon atoms, preferably methyl and isopropyl;

$R_1$ and $R_2$ being the same or different when both are lower alkyl.

In particular, R is lower alkyl, especially $C_{1-2}$ alkyl; R' is $C_{1-6}$ alkyl, especially $C_{2-4}$ alkyl, or cyclohexyl; $R_1$ is hydrogen or lower alkyl, especially $C_{1-3}$ alkyl; and $R_2$ is hydrogen or lower alkyl, especially $C_{1-3}$ alkyl.

Preferably, R is $C_{1-2}$ alkyl, R' is $C_{2-4}$ alkyl; $R_1$ is hydrogen or $C_{1-3}$ alkyl; and $R_2$ is hydrogen or $C_{1-3}$ alkyl.

The instant compounds particularly contemplate amido,-N-$C_{1-3}$ alkylamido- and N-$C_{1-3}$ alkyl-N-$C_{1-3}$ alkylamido-O-$C_{1-2}$ alkyl-O-[(2 - carbo-$C_{2-4}$ alkoxy)phenyl]-thiono-phosphoric acid esters, especially where R is isopropyl.

The O-alkyl-thiono-phosphoric acid ester dihalides and salicylic acid alkyl esters required as starting materials for the production process of the present invention are known from the literature and are readily available on an industrial scale. The same is true of the starting amines.

Both the first and the second step of the production process of the present invention are preferably carried out in the presence of a solvent (this term includes a mere diluent). As such, particularly suitable are water; low-boiling aliphatic alcohols, e.g. methanol, ethanol, propanol, butanol; ketones, e.g. acetone, methylethyl ketone, methylisopropyl ketone or methylisobutyl ketone; nitriles, e.g. acetonitrile and propionitrile; (optionally chlorinated) aliphatic or aromatic hydrocarbons, e.g. methylene chloride, ethylene chloride, chloroform, carbon tetrachloride, mono-, di- and tri - chloroethylene, benzene, toluene, xylene, chlorobenzene; and ethers, e.g. diethyl ether, di-n-butyl ether or dioxan; and the like.

The first reaction step is preferably carried out in the presence of an acid-binding agent, while in the second step an excess of ammonia or primary or secondary amine serves advantageously as acid acceptor. Otherwise, alkali metal hydroxides, carbonates and alcoholates, such as potassium or sodium hydroxide, carbonate, methylate or ethylate, and also tertiary bases, such as triethylamine, diethylaniline or pyridine, and the like may be used for this purpose. Finally, it is also possible, instead of working in the presence of an acid-binding agent, to start from the appropriate salt, preferably an alkali metal salt or ammonium salt of the salicylic acid ester concerned.

The carrying out of the production process according to the present invention is possible within a fairly wide temperature range. In general, the work is carried out at room temperature or slightly to moderately elevated temperature, and preferably at substantially between about 20–60° C.

It has proved expedient, in both the first and second steps of the process, to continue stirring the reaction mixture (in each case, after combining the starting components) for a longer period (between 3 and 24 hours—optionally with slight heating) in order to complete the reaction.

According to the Equations (a) and (b) given above, equimolar amounts of the starting materials are theoretically necessary. It has proved advantageous first to add the mixture of salicylic acid alkyl ester, acid acceptor and solvent (or the appropriate salt of the salicylic acid alkyl ester) to the O-alkyl-thiono-phosphoric acid ester dichloride and, in the second step of the reaction, to add ammonia or the primary or secondary amine concerned to the O-alkyl-thiono-phosphoric acid ester monohalide—if desired, dissolved in one of the aforesaid solvents; the reverse sequence may, however, also be followed.

Working up of the mixture may take place in each case in the usual manner by taking up the former in a water-immiscible solvent, preferably a hydrocarbon or ether, washing the solution obtained, evaporating the solvent after separation of the layers and drying of the organic phase, and, if possible, subjecting the residue to fractional distillation.

The amido-thiono-phosphoric acid phenyl esters of the present invention are obtained either in the form of solid crystalline substances which can readily be further purified by recrystallization from the usual solvents or they are colorless to slightly colored, water-insoluble oils, some of which can be distilled under greatly reduced pressure without decomposition. When such distillation is not possible, the compounds can, however, be freed from the last volatile constituents by so-called "slight distillation," that is, brief heating to slightly to moderately elevated temperature. In this way they can be purified.

As already stated above, the amido-thiono-phosphoric acid phenyl esters of the present invention possess an outstanding, rapidly-commencing and long-lasting insecticidal and acaricidal activity with, in some cases, extremely low toxicity to warm-blooded animals, and concomitantly slight phytotoxicity. The instant compounds are therefore usable with success in plant protection and the protection of stored products, as well as in the hygiene and veterinary medical fields, for the control of noxious sucking and biting insects, Diptera and mites.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimum*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Küniella*) and greater wax moth (*Galleria mellonella*); and the like. Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), but also species living in the soil, for example wireworms (Agriotes spec.) and larvae of the cockchafer (*Melolontha melolontha*); cockroaches, such as the German cockroach (*Blatella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domestica*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (Ornithodorus moubata); and the like.

When used against hygiene pests and pests of stored products, particularly flies and gnats, the instant new active compounds are also distinguished by an outstanding residual activity on wood and clay, as well as a good stability to alkali on limed substrates.

In the veterinary medical field the new compounds of the present invention are usable with success against numerous noxious animal parasites (ectoparasites and endoparasites), such as arachnids, insects and worms; and the like.

As ectoparasites of animals as contemplated herein, there are mentioned from the class of the Arachnida: Ixodidae, as for example the cattle tick (*Boophilus microplus*) (strains normally sensitive to, and strains resistant to, phosphoric acid esters) and the sheep tick (*Rhipicephalus bursa*); Gamasidae, as for example the red birdmite (*Dermanyssus gallinae*); Sarcoptidae, as for example the cattle digging-mite (*Sarcoptes bovis*), the dog digging-mite (*Sarcoptes canis*), the sheep sucking-mite (*Psoroptes ovis*), the rabbit sucking-mite (*Psoroptes cuniculi*) and the mouse scab-mite (*Myobia musculi*); and the like.

As ectoparasites from the class of the insects as contemplated herein, there are mentioned. Mallophaga, as for example the dog hair-louse (*Trichodectes canis*), the cattle hair-louse (*Damalinea bovis*) and the hen feather-louse (*Eomenacanthus stramineus*); Anoplura, as for example the short-nosed cattle louse (*Haematopinus eurysternus*); Diptera, as for example the sheep ked (*Melophagus ovinus*) and Diptera larvae parasitic in warm-blooded animals, as for example *Lucilia sericata, Lucilia cuprina, Chrysomyia chloropyga* and larvae of warble-flies, as for example the cattle warble-fly (*Hypoderma bovis*); Aphaniptera, as for example the dog flea (*Ctenocephalides canis*); and the like.

As endoparasites in animals as contemplated herein, there are mentioned from the class of the nematodes: Strongylidae, as for example the nodule worm of sheep (*Oesophagostomum columbianum*); Ancylostomatidae, as for example the dog hock-warm (*Uncinaria stenocephala*) and the dog hook-worm *Ancylostoma caninum*; Ascarididae, as for example the dog ascarids (*Toxocara canis* and *Toxascaris leonina*); Trichostrongylidae, as for example the sheep abomasum-worm (*Haemonchus contortus*) and the worm of the small intestine of sheep (*Trichostrongylus colubriformis*); Trichuridae, as for example the hen hair-worm (*Capillaria obsignata*); and the like.

The active compounds according to the instant invention can be utilized, if desired, in the form of the usual formulations or compositions with inert conventional pesticidal diluents or extenders, i.e. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1)

a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. arthropods, i.e. insects and acarids, and more particularly, methods of combating at least one of insects and acarids which comprises applying to at least one of correspondingly (a) such insects, (b) such acarids, and (c) the corresponding habitat, i.e. the locus to the protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated without limitation by the following examples:

EXAMPLE 1

Phaedon larvae test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with this preparation of the given active compound until dripping wet and then infested with mustard beetle larvae (*Phaedon cochleariae*).

After the period of time stated in the following table, the degree of destruction of the pests is determined and expressed as a percentage: 100% means that all and 0% means that none of the beetle larvae are killed.

The particular active compounds tested, their concentrations, the evaluation time and the experimental results obtained can be seen from the following Table 1:

TABLE 1

| Active compound (constitution) | Concentration of active compound in percent | Degree of destruction in percent after 3 days |
|---|---|---|
| (B) 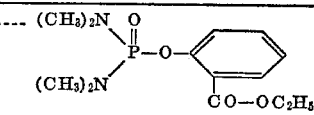 (known comparative product) | 0.1 | 0 |
| (A) 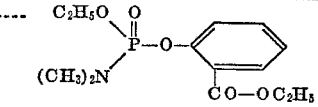 (known comparative product) | 0.1<br>0.01 | 100<br>0 |
| (C) 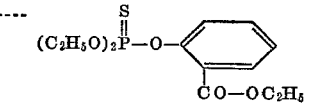 (known comparative product) | 0.1 | 0 |
| (1₁) 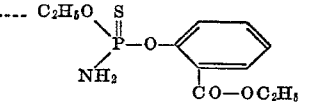 | 0.1<br>0.01 | 100<br>100 |
| (2₁) 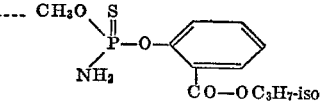 | 0.1<br>0.01<br>0.001 | 100<br>100<br>95 |
| (3₁) 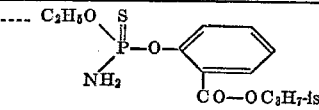 | 0.1<br>0.01<br>0.001 | 100<br>100<br>100 |

TABLE 1—Continued

| Active compound (constitution) | Concentration of active compound in percent | Degree of destruction in percent after 3 days |
|---|---|---|
| ($4_1$) $CH_3O$-P(=S)(-NH-$CH_3$)-O-C$_6$H$_4$-CO-O-$C_3H_7$-iso | 0.1 / 0.01 / 0.001 | 100 / 100 / 100 |
| ($5_1$) $C_2H_5O$-P(=S)(-NH-$CH_3$)-O-C$_6$H$_4$-CO-O-$C_2H_7$-iso | 0.1 / 0.01 / 0.001 | 100 / 100 / 100 |
| ($6_1$) $C_2H_5O$-P(=S)(-N($CH_3$)$_2$)-O-C$_6$H$_4$-CO-O-$C_3H_7$-iso | 0.1 / 0.01 | 100 / 40 |
| ($7_1$) $C_2H_5O$-P(=S)(-NH-iso-$C_3H_7$)-O-C$_6$H$_4$-CO-O-$C_3H_7$-iso | 0.1 / 0.01 / 0.001 | 100 / 100 / 100 |
| ($8_1$) $C_2H_5O$-P(=S)(-$NH_2$)-O-C$_6$H$_4$-CO-O-$C_3H_7$-n | 0.1 / 0.01 | 100 / 100 |
| ($9_1$) $C_2H_5O$-P(=S)(-$NH_2$)-O-C$_6$H$_4$-CO-O-CH($CH_3$)($C_2H_5$) | 0.1 / 0.01 | 100 / 100 |

EXAMPLE 2

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100% means that all the aphids are killed whereas 0% means that none of the aphids are killed.

The particular active compounds tested, their concentrations, the evaluation time and the results obtained can be seen from the following Table 2:

TABLE 2

| Active compound (constitution) | Concentration of active compound in percent | Degree of destruction in percent after 24 hours |
|---|---|---|
| (B) ($CH_3$)$_2$N-P(=O)(-N($CH_3$)$_2$)-O-C$_6$H$_4$-CO-O-$C_2H_5$ (known comparative preparation) | 0.1 | 0 |
| (A) $C_2H_5O$-P(=O)(-N($CH_3$)$_2$)-O-C$_6$H$_4$-CO-O-$C_2H_5$ (known comparative preparation) | 0.1 | 0 |
| (C) ($C_2H_5O$)$_2$P(=S)-O-C$_6$H$_4$-CO-O-$C_2H_5$ (known comparative preparation) | 0.1 | 0 |
| ($1_2$) $C_2H_5O$-P(=S)(-$NH_2$)-O-C$_6$H$_4$-CO-O-$C_2H_5$ | 0.1 | 98 |

TABLE 2—Continued

| Active compound (constitution) | Concentration of active compound in percent | Degree of destruction in percent after 24 hours |
|---|---|---|
| ($2_2$) CH$_3$O—P(=S)(NH$_2$)—O—C$_6$H$_4$—CO—OC$_3$H$_7$-iso | 0.1<br>0.01 | 100<br>98 |
| ($3_2$) C$_2$H$_5$O—P(=S)(NH$_2$)—O—C$_6$H$_4$—CO—OC$_3$H$_7$-iso | 0.1<br>0.01 | 85<br>40 |
| ($7_2$) C$_2$H$_5$O—P(=S)(iso-C$_3$H$_7$—NH)—O—C$_6$H$_4$—CO—OC$_3$H$_7$-iso | 0.1 | 96 |
| ($9_2$) C$_2$H$_5$O—P(=S)(NH$_2$)—O—C$_6$H$_3$(CH$_3$)—CO—OCH(CH$_3$)(C$_2$H$_5$) | 0.1<br>0.01 | 100<br>30 |

EXAMPLE 3

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of devolopment.

After the specified period of time, the effectiveness of the preparation of given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 3:

TABLE 3

| Active compound (constitution) | Concentration of active compound in percent | Degree of destruction in percent after 8 days |
|---|---|---|
| (B) (CH$_3$)$_2$N—P(=O)((CH$_3$)$_2$N)—O—C$_6$H$_4$—CO—OC$_2$H$_5$<br>(known comparative preparation) | 0.1 | 0 |
| (A) C$_2$H$_5$O—P(=O)((CH$_3$)$_2$N)—O—C$_6$H$_4$—CO—OC$_2$H$_5$<br>(known comparative preparation) | 0.1 | 0 |
| (C) (C$_2$H$_5$O)$_2$P(=S)—O—C$_6$H$_4$—CO—OC$_2$H$_5$<br>(known comparative preparation) | 0.1 | 0 |
| ($2_3$) CH$_3$O—P(=S)(NH$_2$)—O—C$_6$H$_4$—CO—OC$_3$H$_7$-iso | 0.1<br>0.01 | 100<br>90 |
| ($1_3$) C$_2$H$_5$O—P(=S)(NH$_2$)—O—C$_6$H$_4$—CO—OC$_2$H$_5$ | 0.1 | 98 |

TABLE 3—Continued

| Active compound (constitution) | Concentration of active compound in percent | Degree of destruction in percent after 8 days |
|---|---|---|
| (3₃) 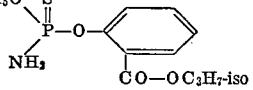 | 0.1<br>0.01 | 100<br>70 |
| (4₂) 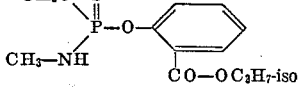 | 0.1 | 98 |
| (7₃) 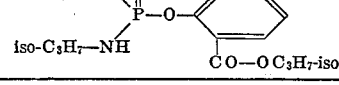 | 0.1 | 100 |
| (8₂) 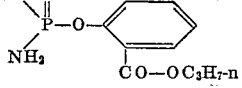 | 0.1 | 100 |
| (9₃) 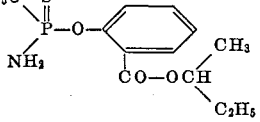 | 0.1<br>0.01 | 100<br>70 |

EXAMPLE 4

Tick test

Solvent: 35 parts by weight ethylglycol monomethyl ether
Emulsifier: 35 parts by weight nonylphenyl polyglycol ether To produce a suitable formulation, three parts by weight of the particular active compound are mixed with seven parts of a mixture of the stated amounts of the solvent and emulsifier and the emulsion concentrate so obtained is diluted with water to the concentration desired in each case.

Adult gorged female ticks of the species *Boophilus microplus* (sensitive and resistant, respectively), are immersed for one minute in the particular preparation of the given active compound. After immersion of, in each case, 10 female specimens of the various species of ticks, these are transferred to Petri dishes, the bottom of each of which is covered with a correspondingly large disc of filter paper.

After 10 days, the effectiveness of the preparation of the given active compound is determined by ascertaining the inhibition of the depositing of eggs compared with untreated control ticks.

The effect is expressed as a percentage, 100% meaning that eggs ceased to be deposited and 0% signifying that the ticks deposited eggs in the normal amount.

The particular active compounds investigated, their concentrations, the parasites tested and the findings obtained can be seen from the following Table 4:

TABLE 4

| Active compound (constitution) | Parasite | Concentration of active compound in solution in percent | Inhibition of the depositing of eggs in percent |
|---|---|---|---|
| (B) 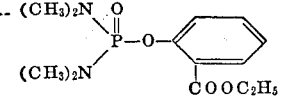<br>(known comparative preparation) | *Boophilus microplus*<br><br><br>Sensitive | 1.0<br>0.3<br>0.1<br>0.03<br>0.01<br>0.003 | >50<br><50<br><50<br><50<br>0<br>0 |
| (A) 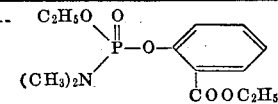<br>(known comparative preparation) | *Boophilus microplus*<br><br><br>Sensitive | 1.0<br>0.3<br>0.1<br>0.03<br>0.01<br>0.003 | >50<br><50<br><50<br><50<br>0<br>0 |
| (C) 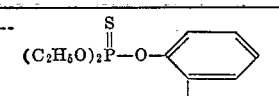<br>(known comparative preparation) | *Boophilus microplus*<br><br><br>Sensitive | 1.0<br>0.3<br>0.1<br>0.03<br>0.01<br>0.003 | >50<br><50<br><50<br><50<br>0<br>0 |
| (3₁) 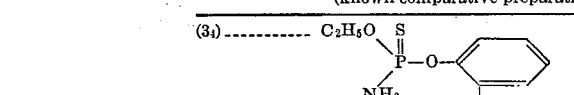 | *Boophilus microplus*<br><br><br>Sensitive | 1.0<br>0.3<br>0.1<br>0.03<br>0.01<br>0.003 | 100<br>100<br>100<br>>50<br>>50<br><50 |

TABLE 4—Continued

| Active compound (constitution) | Parasite | Concentration of active compound in solution in percent | Inhibition of the depositing of eggs in percent |
|---|---|---|---|
| (7₄) $C_2H_5O\underset{iso\text{-}C_3H_7NH}{\overset{S}{\diagdown}}P-O-\underset{COOC_3H_7iso}{\bigcirc}$ | Boophilus microplus<br>Sensitive | 1.0<br>0.3<br>0.1<br>0.03<br>0.01<br>0.003<br>0.001 | 100<br>100<br>100<br>100<br>100<br>100<br><50 |
| (9₄) $C_2H_5O\underset{NH_2}{\overset{S}{\diagdown}}P-O-\underset{COOCH\text{-}CH_3 \atop C_2H_5}{\bigcirc}$ | Boophilus microplus<br>Sensitive | 1.0<br>0.3<br>0.1<br>0.03 | 100<br>100<br>100<br><50 |
| (2₄) $CH_3O\underset{NH_2}{\overset{S}{\diagdown}}P-O-\underset{COOC_3H_7iso}{\bigcirc}$ | Boophilus microplus<br>Sensitive | 1.0<br>0.3<br>0.1<br>0.03 | 100<br>>50<br>>50<br><50 |

EXAMPLE 5

Test with parasitic fly larvae

Solvent: 35 parts by weight ethylpolyglycol monomethyl ether

Emulsifier: 35 parts by weight nonylphenol polyglycol ether

To produce a suitable preparation of the particular active compound, 30 parts by weight of such active compound is mixed with the stated amount of solvent which contains the stated amount of emulsifier, and the resulting concentrate is diluted with water to the desired final concentration.

About 20 fly larvae (*Chrysomyia chloropyga*) are brought into a test-tube which contains about 2 cc. of horse muscle. Onto this horseflesh are brought 0.5 ml. of the above preparation of the given active compound. After 24 hours, the degree of destruction is determined as a percentage. 100% means that all, and 0% that no, larvae were killed.

The particular active compounds investigated, their concentrations and the findings obtained can be seen from the following Table 5:

TABLE 5

| Active compound (constitution) | Parasite | Concentration of active compound in solution in percent | Degree of destruction in percent |
|---|---|---|---|
| (B) $(CH_3)_2N\underset{(CH_3)_2N}{\overset{O}{\diagdown}}P-O-\underset{COOC_2H_5}{\bigcirc}$<br>(known comparative preparation) | Chrysomyia chloropyga | 0.03<br>0.01<br>0.003<br>0.001 | 0<br>0<br>0<br>0 |
| (A) $C_2H_5O\underset{(CH_3)_2N}{\overset{O}{\diagdown}}P-O-\underset{COOC_2H_5}{\bigcirc}$<br>(known comparative preparation) | Chrysomyia chloropyga | 0.03<br>0.01<br>0.003<br>0.001 | 0<br>0<br>0<br>0 |
| (C) $(C_2H_5O)_2\overset{S}{\overset{\|}{P}}-O-\underset{COOC_2H_5}{\bigcirc}$<br>(known comparative preparation) | Chrysomyia chloropyga | 0.03<br>0.01<br>0.003<br>0.001 | 0<br>0<br>0<br>0 |
| (3₅) $C_2H_5O\underset{NH_2}{\overset{S}{\diagdown}}P-O-\underset{COOC_3H_7\text{-}iso}{\bigcirc}$ | Chrysomyia chloropyga | 0.03<br>0.003<br>0.0003<br>0.00003 | 100<br>100<br>>50<br>0 |
| (1₄) $C_2H_5O\underset{NH_2}{\overset{S}{\diagdown}}P-O-\underset{COOC_2H_5}{\bigcirc}$ | Chrysomyia chloropyga | 0.03<br>0.003<br>0.0003 | 100<br>>50<br>0 |

TABLE 5—Continued

| Active compound (constitution) | Parasite | Concentration of active compound in solution in percent | Degree of destruction in percent |
|---|---|---|---|
| (2₅) 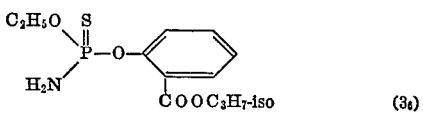 | Chrysomyia chloropyga | 0.03<br>0.003<br>0.0003 | 100<br>100<br>>50 |
| (7₅) 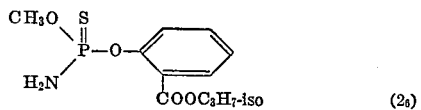 | Chrysomyia chloropyga | 0.03<br>0.003<br>0.0003<br>0.00003 | 100<br>100<br>>50<br>0 |

The process of the invention is illustrated by the following examples:

EXAMPLE 6

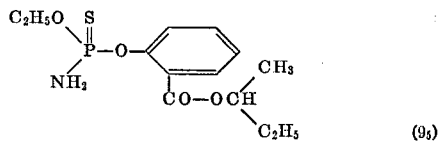

(3₆)

(a) 1-molar mixture: To 180 g. ethyl-thiono-phosphoric acid ester dichloride there are added at 40 to 50° C., with stirring, a mixture of 136 g. salicylic acid isopropyl ester, 220 g. water and 24 g. sodium hydroxide; the reaction mixture is then stirred for 4 hours and it is then taken up in 400 ml. benzene. The benzene solution is washed twice with water, dried over sodium sulfate and, finally, the product is fractionally distilled. 155 g. O-ethyl - O - [(2-carbo-isopropoxy)phenyl]-thiono-phosphoric acid diester monochloride of B.P. 120°/0.01 mm. Hg are obtained.

(b) 0.2-molar mixture: 66 g. (0.2 mol) of the O-ethyl-O-[(2-carbo-isopropoxy)phenyl]-thiono - phosphoric acid diester monochloride prepared according to (a) are added, with stirring, to 90 ml. of 15% ammonia solution. The temperature of the solution rises gradually to 20 to 60° C. After subsidence of the exothermic reaction, the mixture is stirred for a further 24 hours at room temperature. The reaction mixture is then taken up in 200 ml. benzene, the benzene solution is washed with water until it has a neutral reaction, then dried over sodium sulfate, and the solvent is removed under reduced pressure. 46 g. (76% of the theory) of the amido-thiono-phosphoric acid O-ethyl-O-[(2-carbo-isopropoxy)phenyl] ester are obtained in the form of a colorless, water-insoluble oil.

Analysis.—Calcd. for $C_{12}H_{18}NO_4PS$ (molecular weight 303) (percent): P, 10.2; N, 4.6. Found (percent): P, 9.9; N, 4.3.

The median toxicity of the compound in the rat per os is 1000 mg./kg.

EXAMPLE 7

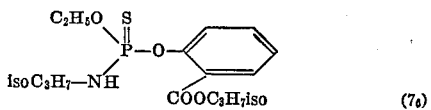

(2₆)

(a) The O-methyl - O - [(2-carbo-isopropoxy)phenyl]-thiono-phosphoric acid diester monochloride required as intermediate product is prepared in manner analogous with the corresponding O-ethyl compound [cf. Example 6(a)]. The substance is obtained in the form of a non-distillable oil. The yield is 60% of the theory.

Analysis.—Calcd. for $C_{11}H_{14}ClO_4PS$ (molecular weight 308.5) (percent): P, 10.0; S, 10.4. Found (percent): P, 9.4; S, 9.7.

(b) Preparation takes place by a method analogous to that of Example 6(b). The amido-thiono-phosphoric acid O-methyl-O-[(2-carbo-isopropoxy)phenyl] ester, after recrystallization from a ligroin-ethyl acetate mixture, melts at 44° C.

Analysis.—Calcd. for $C_{11}H_{16}NO_4PS$ (molecular weight 289) (percent): P, 10.7; S, 11.1; N, 4.8. Found (percent): P, 10.7; S, 11.1; N, 4.8.

EXAMPLE 8

(9₆)

(a) In manner analogous with that described in Example 6(a), the O-ethyl-O-[(2-carbo-sec.-butoxy)phenyl]-thionophosphoric acid diester monochloride is obtained as non-distillable oil with a yield of 82% of the theory.

Analysis.—Calcd. for $C_{13}H_{18}ClO_4PS$ (molecular weight 336.5) (percent): P, 9.2; S, 9.5. Found (percent): P, 9.0; S, 9.3.

(b) By reaction of O-ethyl-O-[2-carbo-sec.-butoxy)phenyl]-thiono-phosphoric acid diester monochloride with ammonia according to Example 6(b), the amido-thiono-phosphoric acid O-ethyl-O-[(2-carbo-sec.-butoxy)phenyl] ester is obtained in a yield of 99% of the theory.

Analysis.—Calcd. for $C_{13}H_{20}NO_4PS$ (molecular weight 317.5): P, 9.8%. Found: P, 9.3%.

EXAMPLE 9

(7₆)

To a solution of 162 g. (0.5 mol) O-ethyl-O-[(2-carbo-isopropoxy)phenyl]-thiono-phosphoric acid diester monochloride (prepared according to Example 6(a) in 600 ml. benzene there are added, at 20 to 40° C., 75 g. isopropylamine dissolved in 75 ml. benzene. After subsequent stirring of the reaction mixture for one hour, it is extracted with water, the benzene phase is separated, dried, and evaporated, and the residue is fractionally distilled. The N-isopropylamido-thiono-phosphoric acid O-ethyl-O-[(2-carbo-isopropoxy)phenyl] ester boils at 120° C. under a pressure of 0.01 mm. Hg. The yield is 140 g. (82% of the theory).

Analysis.—Calcd. for $C_{15}H_{24}NO_4PS$ (molecular weight 345) (percent): P, 9.0; S, 9.3; N, 4.1. Found (percent): P, 9.2; S, 9.7; N, 4.2.

In analogous manner, the following compounds can be obtained:

described in Example 6(b) with a yield of 62% of the theory.

| | | Yield, percent of the theory | Empirical formula | Molecular weight | Percent Calculated | | | Percent Found | | |
|---|---|---|---|---|---|---|---|---|---|---|
| | Constitution | | | | P | S | N | P | S | N |
| (5₂) | 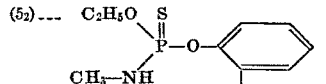 CH₃—NH, C₂H₅O, S, P—O—⟨phenyl⟩—COOC₃H₇iso | 74 | C₁₃H₂₀NO₄PS | 317 | | 4.4 | | | 3.6 | |
| (6₂) | (CH₃)₂N, C₂H₅O, S, P—O—⟨phenyl⟩—COOC₃H₇iso | 76 | C₁₄H₂₂NO₄PS | 331 | 9.4 | 9.7 | 4.2 | 9.9 | 10.4 | 4.4 |
| (4₃) | CH₃—NH, CH₃O, S, P—O—⟨phenyl⟩—COOC₃H₇iso | 46 | C₁₂H₁₈NO₄PS | 303 | | 4.6 | | | 3.9 | |

EXAMPLE 10

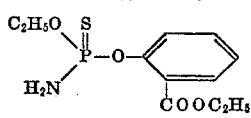

(1₅)

(a) 1 mol of sodium methylate is added to 166 g. (1 mol) salicylic acid ethyl ester in 300 ml. methanol and the solution is concentrated by evaporation. The residue is added, at 20 to 35° C., to 180 g. O-ethyl-thiono-phosphoric acid ester dichloride in 1000 ml. methylethyl ketone; the mixture is then stirred overnight, benzene is added to it, it is extracted with water, and the organic phase is separated, dried and evaporated. There are obtained in this way 220 g. (71% of the theory) of O-ethyl - O - [(2 - carboethoxy)phenyl]-thiono-phosphoric acid diester monochloride of B.P. 110° C./0.01 mm. Hg.

*Analysis.*—Calcd. for C₁₁H₁₄ClO₄PS (molecular weight 308.5) (percent): P, 10.0; S, 10.4; Cl, 11.5. Found (percent): P, 10.7; S, 10.8; Cl, 11.7.

(b) 93 g. (0.3 mol) of the O-ethyl-O-[(2 - carboethoxy)phenyl]-thiono-phosphoric acid diester monochloride prepared according to 10(a) are dissolved in 300 ml. ethylene chloride, and ammonia is introduced into this solution at 20 to 50° C. until cessation of the exothermic reaction. The mixture is then washed with 100 ml. water, the organic phase is dried and evaporated, and the residue is recrystallized from petroleum ether. The yield is 55 g. (63% of the theory). The amido-thiono-phosphoric acid O - ethyl - O - [(2 - carbo - ethoxy)phenyl] ester melts at 42° C.

*Analysis.*—Calcd. for C₁₁H₁₆NO₄PS (molecular weight 289) (percent): P, 10.7; S, 11.1; N, 4.8. Found (percent): P, 10.8; S, 11.1; N, 4.5.

EXAMPLE 11

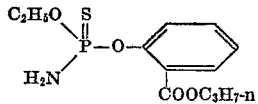

(8₃)

(a) Preparation of the O-ethyl - O - [(2 - carbo-n-propoxy)phenyl]-thiono-phosphoric acid diester monochloride is effected in a manner analogous to that of Example 6(a) for the corresponding isopropyl compound. The product is obtained in the form of a non-distillable oil. The yield is 55% of the theory.

*Analysis.*—Calcd. for C₁₂H₁₆ClO₄PS (molecular weight 322.5) (percent): P, 9.6; S, 9.9. Found (percent): P, 9.3; S, 9.2.

(b) The amido-thiono-phosphoric acid O-ethyl-O-[(2-carbo-n-propoxy)phenyl] ester is obtained in the manner described in Example 6(b) with a yield of 62% of the theory.

*Analysis.*—Calcd. for C₁₂H₁₈NO₄PS (molecular weight 303) (perent): P, 10.2; S, 10.5. Found (percent): P, 9.7; S, 10.0.

EXAMPLE 12

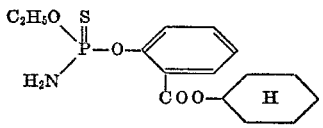

(10₁)

(a) A mixture of 33 g. sodium hydroxide, 200 ml. water and 165 g. salicylic acid cyclohexyl ester is added, at 20 to 30° C., to 135 g. (0.75 mol) O-ethyl-thiono-phosphoric acid ester dichloride. The reaction mixture is subsequently stirred for a further 3 hours, then taken up in ether, the etheral solution is dried, the solvent is evaporated and the O-ethyl - O - [(2-carbo-cyclohexoxy) phenyl]-thiono-phosphoric acid diester monochloride remaining behind as residue is slightly distilled.

*Analysis.*—Calcd. for C₁₅H₂₀ClO₄PS (molecular weight 362.5) (percent): P, 8.5; S, 8.8. Found (percent): P, 8.2; S, 8.3.

(b) 145 g. (0.4 mol) of O-ethyl - O - [(2 - carbo-cyclohexoxy)phenyl]-thiono-phosphoric acid diester monochloride [prepared as described under 12(a)] are stirred together with 100 ml. ammonia solution overnight. The reaction mixture is then taken up in ether, the ethereal solution is dried, the solvent is evaporated, and the residue is slightly distilled.

The yield of amido-thiono-phosphoric acid O-ethyl-O-[(2 - carbo-cyclohexoxy)phenyl] ester is 115 g. (84% of the theory).

*Analysis.*—Calcd. for C₁₅H₂₂NO₄PS (molecular weight 343) (percent): P, 9.0; S, 9.3; N, 4.1. Found (percent): P, 8.9; S, 9.1; N, 3.8.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an

What is claimed is:

1. A method of combating acarids and insects which comprises applying to an acarid, insect or habitat thereof an acaricidally or insecticidally effective amount of a compound of the formula

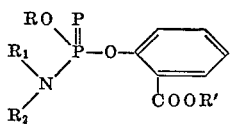

in which

R is lower alkyl,

R' is selected from the group consisting of alkyl having 1–6 carbon atoms and cycloalkyl having 5–6 carbon atoms, $R_1$ is selected from the group consisting of hydrogen and lower alkyl, and $R_2$ is selected from the group consisting of hydrogen and lower alkyl.

2. The method of claim 1, wherein R is $C_{1-4}$ alkyl, R' is selected from the group consisting of $C_{2-6}$ alkyl and cyclohexyl, $R_1$ is selected from the group consisting of hydrogen and $C_{1-4}$ alkyl, and $R_2$ is selected from the group consisting of hydrogen and $C_{1-4}$ alkyl.

3. The method of claim 1 wherein said compound is amido-O-ethyl-O-[(2 - carbo-ethoxy)phenyl]-thiono-phosphoric acid ester of the formula

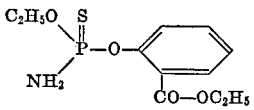

4. The method of claim 1 wherein said compound is amido - O - methyl-O-[(2-carbo-isopropoxy)phenyl]-thiono-phosphoric acid ester of the formula

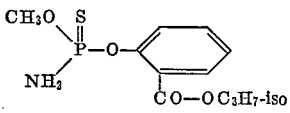

5. The method of claim 1 wherein said compound is amido - O - ethyl-O-[(2-carbo-isopropoxy)phenyl]-thiono-phosphoric acid ester of the formula

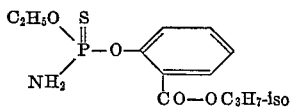

6. The method of claim 1 wherein said compound is N-methyl-amido - O - methyl - O - [(2-carbo-isopropoxy)phenyl]-thiono-phosphoric acid ester of the formula

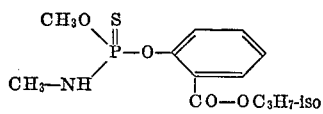

7. The method of claim 1 wherein said compound is N-methyl-amido - O - ethyl-O-[(2-carbo-isopropoxy)phenyl]-thiono-phosphoric acid ester of the formula

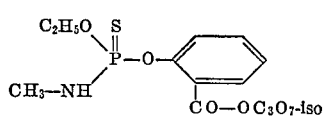

8. The method of claim 1 wherein said compound is N,N-dimethyl-amido - O - ethyl-O-[(2-carbo-isopropoxy)phenyl]-thiono-phosphoric acid ester of the formula

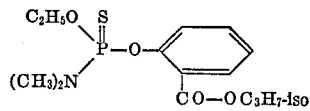

9. The method of claim 1 wherein said compound is N-isopropyl-amido-O-ethyl-O-[(2-carbo-isopropoxy)phenyl]-thiono-phosphoric acid ester of the formula

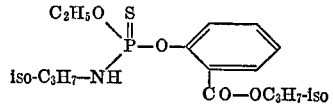

10. The method of claim 1 wherein said compound is amido - O - ethyl-O-[(2-carbo-n-propoxy)phenyl]-thiono-phosphoric acid ester of the formula

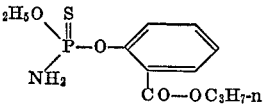

11. The method of claim 1 wherein said compound is amido - O - ethyl-O-[(2-carbo-isobutoxy)phenyl]-thiono-phosphoric acid ester of the formula

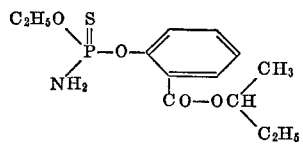

12. The method of claim 1 wherein said compound is amido - O - ethyl - O - [(2-carbo-cyclohexyloxy)phenyl]-thiono-phosphoric acid ester of the formula

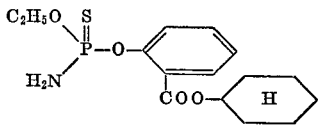

13. An acaricidal and insecticidal composition containing an acaricidally or insecticidally effective amount of a compound of the formula

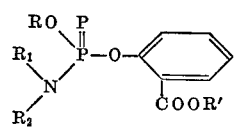

in which

R is lower alkyl,

R' is selected from the group consisting of alkyl having 1–6 carbon atoms and cycloalkyl having 5–6 carbon atoms, $R_1$ is selected from the group consisting of hydrogen and lower alkyl, and $R_2$ is selected from the group consisting of hydrogen and lower alkyl, in admixture with a solid diluent or in admixture with a liquid diluent containing a surface-active agent.

14. The composition of claim 13 wherein said compound is:

amido-O-ethyl-O-[(2-carbo-ethoxy)phenyl]-thiono-phosphoric acid ester, amido-O-methyl-O-[(2-carbo-isopropoxy)phenyl]-thiono-phosphoric acid ester, amido-O-ethyl-O-[(2-carbo-isopropoxy)phenyl]-thiono-phosphoric acid ester, N-methyl-amido-O-methyl-O-[2(2-carbo-isopropoxy)phenyl]-thiono-phosphoric acid ester, N-methyl-amido-O-ethyl-O-[(2-carbo-isopropoxy)phenyl]-thiono-phosphoric acid ester, N,N-dimethyl-amido-O-ethyl-O-[(2-carbo-isopropoxy) phenyl]-thiono-phosphoric acid ester, N-isopropyl-amido-O-ethyl-O-[(2-carbo-isopropoxy) phenyl]-thiono-phosphoric acid ester, amido-O-ethyl-O-[(2-carbo-n-propoxy)phenyl]-thiono-phosphoric acid ester, amido-O-ethyl-O-[(2-carbo-isobutoxy)phenyl]-thiono-phosphoric acid ester, or amido-O-ethyl-O-[(2-carbo-cyclohexyloxy)phenyl]-thiono-phosphoric acid ester.

References Cited

UNITED STATES PATENTS

| | | | |
|---|---|---|---|
| 3,621,082 | 11/1971 | Schrader et al. | 260—941 |
| 2,831,014 | 4/1958 | Sallmann et al. | 260—941 |
| 3,121,105 | 2/1964 | McConnell et al. | 260—941 |

ALBERT T. MEYERS, Primary Examiner

L. SCHENKMAN, Assistant Examiner

PO-1050 (5/69)

UNITED STATES PATENT OFFICE

F. 1494.1

CERTIFICATE OF CORRECTION

Patent No. 3,755,572          Dated August 28, 1973

Inventor(s) Gerhard Schrader et al

It is certified that error appears in the above-identified patent and that said Letters Patent are hereby corrected as shown below:

Col. 2, line 22, change "(II)" to -- (IIb) -- .

Col. 20, line 24 correct spelling of "(percent), first occurrence

Col. 20, line 40, correct spelling of "ethereal".

Col. 21, line 74, claim 7, in the structural formula, change

"CO-OC$_3$O$_7$-iso" to -- CO-OC$_3$H$_7$-iso --.

Col. 22, line 46, claim 13, in the structural formula, change

"P" to -- S --.
"     "
P     P

Signed and sealed this 8th day of October 1974.

(SEAL)
Attest:

McCOY M. GIBSON JR.          C. MARSHALL DANN
Attesting Officer          Commissioner of Patents